Patented Apr. 20, 1937

2,077,396

UNITED STATES PATENT OFFICE 2,077,396

MOISTUREPROOF MATERIAL

William Hale Charch, Buffalo, and Albert Hershberger, Kenmore, N. Y., assignors, by mesne assignments, to E. I. du Pont de Nemours & Company, Wilmington, Del., a corporation of Delaware No Drawing. Application February 24, 1934, Serial No. 712,794. Renewed November 17, 1936

11 Claims. (Cl. 91—68)

This invention relates to flexible and non-tacky, moistureproof, and, preferably also, glass-clear materials admirably suited for use as a wrapping tissue.

We have found that by incorporating rubber or an allied substance in a moistureproofing composition consisting of a wax and a cellulose derivative, with or without a plasticizer, and/or with or without a gum, and/or with or without a blending agent, the wax being present in an amount at least equal to the quantity of the cellulose derivative or alternatively the wax being present in an amount less than the quantity of the cellulose derivative, we can secure, upon the evaporation of the solvent at a temperature at least equal to the melting point of the wax in the composition, a transparent, flexible and moistureproof coating or film which has better heat sealing properties and/or anchors or adheres more firmly to the base material to which it is applied than similar coatings or films without the rubber constituent.

The material constituting the instant invention consists of a base formed of a material having a smooth, dense, non-porous surface thinly coated on both sides with the composition hereafter more fully explained. In the preferred embodiment of the invention, the base material is also non-fibrous and transparent. As illustrative examples of materials which have given satisfactory results when used as the base may be mentioned sheeting formed of cellulosic materials, for example, regenerated cellulose, glycol cellulose, cellulose acetate, sheeting formed of albuminous materials, for example, casein, gelatin, etc. Bases such as "glassine" paper or other papers having the surface characteristics mentioned may also be utilized.

The coating on the sheeting, as more fully explained hereafter, is moistureproof, flexible, non-tacky, odorless and transparent. Thus, in the preferred embodiment, when a transparent base is used, the ultimate product is also transparent.

In general, the coating may be obtained from four types of compositions, the constituents of which consist of the following:

(1) rubber, cellulose derivative, wax, and solvent;

(2) rubber, cellulose derivative, wax, plasticizer and solvent;

(3) rubber, cellulose derivative, wax, resin or blending agent, and solvent;

(4) rubber, cellulose derivative, wax, resin or blending agent, plasticizer and solvent.

In any of the above compositions, there may be incorporated ingredients which produce special effects in the coating. For example, substances which impart a hard surface to the coating, dyes, pigments, etc. may be incorporated.

For the rubber constituent, pale crepe rubber is preferred. However, similar or allied substances, such as, for example, balata, caoutchouc and gutta percha, and rubber derivatives, for example, hydrogenated rubber and chlorinated rubber, may be used. As another specific rubber derivative may be mentioned the thermoplastic, resin-like, rubber derivative obtained by reacting rubber or a rubber solution with a halide salt or halogenated acid of a metal having a plurality of secondary valences, such as tin tetrachloride or tetrabromide, antimony pentachloride, titanium tetrachloride, boron trichloride, ferric chloride, antimony trichloride, boron trifluoride, fluoboric acid, chlorostannic or chlorostannous acid and the like, as described by Thies and Clifford in the "Journal of Industrial and Engineering Chemistry", vol. 26, page 123 (1934). The thermoplastic, rubber derivative obtained in the above-mentioned manner through the use of tin compounds has been found to be particularly desirable as a film-forming ingredient. These products are commonly known as thermoplastic rubber derivatives of the "Plioform" type. The aforementioned rubber and like materials may be used singly or in combination with one another.

As the cellulose derivative, a soluble pyroxylin of any desired viscosity, for example, from ½ second up to 60 seconds or even more, and of any suitable nitrogen content, such as that of nitrocelluloses ordinarily used in lacquers, is preferred. Though a pyroxylin of the type above mentioned is preferred, it is also possible to use other cellulose derivatives, such as the higher esters, mixed esters and ether esters, as well as the cellulose ethers, such as ethyl or benzyl cellulose.

As the wax, paraffins, particularly the high melting point paraffins having a melting point above 50° C., and preferably in the neighborhood of 60° C. or over, are preferred. Other waxes, such as palm wax, candelilla wax, carnauba wax, certain synthetic waxes or wax-like materials, or esters obtained chemically from the higher alcohols and acids, such as montanic acid ester of lauryl alcohol, "vasoline", etc. may be used. The wax or wax-like materials may be used singly or in combination.

When the composition is of the type which includes also a resin or blending agent, the ordinary lacquer resins and preferably those resins which are soluble in solvents, such as toluene, benzene, etc., are preferred. Those resins which act as blending agents for the wax and cellulose derivative and which impart a hard, non-greasy surface to the coating are especially desirable. As illustrative examples of the particularly suitable resins may be mentioned dammar, ester gum, rosin, hydrogenated rosin, esters of hydrogenated rosins with various types of mono- or polyhydric alcohols, gum mastic, synthetic resins of the type soluble or partially soluble in aromatic hydrocarbons, etc.

When the composition is of the type which includes also a plasticizer, it is possible to use the ordinary plasticizers, such as dibutyl phthalate, tricresyl phosphate, etc. Certain plasticizers may function both as a plasticizer and a blending agent for the wax and the cellulose derivative. As an illustrative example for use in connection with ethyl cellulose, dixylyl ethane may be mentioned.

When the composition is of the type which includes a blending agent, any blending agent may be used in any suitable quantity, depending on the properties desired in the final product. As illustrative examples of blending agents which have given satisfactory results may be mentioned hydrogenated castor oil, wool grease, fatty acid glycerides, Japan wax, ricinoleic acid and its various esters, liquid esters of rosin and hydrogenated rosin, etc.

As the solvent or solvent mixture, it is preferred to use one which is a mutual solvent for the cellulose derivative and the rubber constituents. Preferably, hydrocarbon solvents, such as benzene, toluene, etc. and/or chlorinated hydrocarbon solvents, such as ethylene dichloride, trichlorethylin, etc., are preferred. Where the cellulose derivative is of a type which is not completely soluble in such solvents alone, for instance, as in the case of pyroxylin, additional substantial quantities of a pyroxylin solvent, for instance, amyl acetate or the higher acetates, cyclohexyl acetate, cyclohexanone and ethyl lactate, which at the same time possesses solubility or swelling properties for the rubber, may be used. The lower alcohols and esters of the lower alcohols and low molecular weight acids, generally as a class do not possess sufficient solubility characteristics, and therefore the higher members of this series are preferred.

The quantitive proportions of the ingredients constituting the different compositions may vary within wide limits, depending on the degree of transparency, moistureproofness, the surface characteristics required in the finished film, etc.

The coating composition in each of the aforementioned compositions contains sufficient quantity of solvent or solvent mixture to produce a solution having a solids content of from 2%–20%, and preferably 5%–10%, by weight.

The selected composition is applied to the chosen base, which for convenience is now referred to as regenerated cellulose sheeting, in any suitable manner, such as by dipping, spraying, etc. The excess coating material is then removed by scraping or any other suitable means, and the coated sheets transferred to a drying apparatus held at a temperature at least equal to the melting point of the wax in the composition, such as 80° C.–110° C. After drying, which is completed in a very short interval of time, such as from 2 seconds to 3 minutes, if it is desired to remove the last traces of solvent and restore the flexibility to the base of regenerated cellulose sheeting, the coated sheet may be subjected to a humidifying treatment.

As previously mentioned, the composition is applied to the base in a relatively thin coating; thus the total coating thickness on both sides of the base film may be from approximately 0.00001 to 0.00015 of an inch, although in certain instances it may be possible to use coatings of somewhat greater thickness. In the preferred embodiment of the invention, the total coating thickness on both sides of the film will be from approximately 0.00004 to 0.00008 of an inch. When the coating composition does not include a blending agent, the coating thickness should generally be less than the coating thickness used when the composition contains a blending agent and should generally approach the lower limits of the thickness range set forth above.

The coated materials produced by this invention are truly heat-sealable, that is, when the films and coatings are of the thickness previously described they are heat-sealed, there will be produced a seal or joint which is stronger than that produced by heat sealing materials of the prior art such, for example, as that described in United States Patent No. 1,737,187.

The following test has been devised to determine and test the strength of the joints before mentioned:

Strips of the coated material 1.5 inches wide are superposed on one end, so that the opposite faces of the film are in contact. A seal is made across the width of the material by imposing thereon a heated iron weighing 1,500 grams for 2 seconds. The iron is so designed as to cause a seal to be made of a width of $\frac{3}{32}$ of an inch, the iron being maintained in any suitable manner at a temperature above 130° C. and below 200° C., as, for instance, 150° C. Two strips so sealed are opened at the free end and placed in a stretching device, such as a Suter testing machine, by gripping each end of the sheet in suitable clamps, one of which is fixed and the other of which is moved away at a constant speed of 12 inches per minute. The force in grams required to pull the sheets apart is taken as a measure of the strength of the bond and is referred to herein as "heat-sealing value".

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005 of an inch to both sides of a sheet of regenerated cellulose of thickness approximately 0.0009 of an inch, will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005 of an inch to both sides of a sheet of regenerated cellulose of thickness approximately 0.0009 of an inch, will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009 of an inch will show a permeability value of the order of 6900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

In order to more fully explain the nature of the invention, the following illustrative examples are set forth:

Examples of rubber-pyroxylin-wax

*Example A1.*—The following ingredients in approximately the proportions set forth are dissolved in 1,000 parts by weight of a solvent composed of 60% toluene and 40% amyl acetate:

|  | Parts by weight |
|---|---|
| Pale crepe rubber | 10 |
| Pyroxylin (51 seconds) | 80 |
| Paraffin (M. P. 60–62° C.) | 10 |

A sheet of regenerated cellulose is coated, dried and humidified as previously described. The product possesses a slight haze and is not absolutely glass-clear. The surface gloss and brilliance of the sheet are somewhat dull, but for certain uses dullness is a desirable property, for instance, in the case where these coated sheets are used for window envelopes, the strong glare which is sometimes considered objectionable when it is desired to read writing or printing through the sheet at an angle is avoided.

*Example A2.*—The following ingredients in the proportions set forth are dissolved in the same solvent mixture as set forth in Example A1:

|  | Parts by weight |
|---|---|
| Pale crepe rubber | 7 |
| Pyroxylin (51 seconds) | 10 |
| Paraffin (M. P. 60–62° C.) | 83 |

The process of coating, drying and humidifying is the same as in Example A1.

The coated sheet is clear, transparent and possesses no haze.

*Example A3.*—The following ingredients are dissolved in a solvent the same as set forth in Example A1:

|  | Parts by weight |
|---|---|
| Pale crepe rubber | 7 |
| Pyroxylin (51 seconds) | 10 |
| Paraffin (M. P. 60–62° C.) | 60 |
| Refined carnauba wax | 13 |

The process and the properties of the finished coated regenerated cellulose sheet are the same as in Example A2.

Examples of rubber-pyroxylin-wax-plasticizer

*Example B1.*—A sufficient quantity of the following ingredients in the proportions set forth is dissolved in a mixture of 60% toluene and 40% amyl acetate to give a solution containing 10% solids:

|  | Parts by weight |
|---|---|
| Pale crepe rubber | 9 |
| Pyroxylin (51 seconds) | 72 |
| Paraffin (M. P. 60–62° C.) | 9 |
| Tricresyl phosphate | 10 |

The process of coating, drying and humidifying is the same as in Example A1.

The coatings are glass-clear.

*Example B2.*—Same as Example B1, but substitute "balata" for "pale crepe rubber".

The process of coating, drying and humidifying is the same as in Example B1.

The coatings are clear.

Examples of rubber-pyroxylin-wax-resin

*Example C1.*—The following ingredients in the proportions set forth are dissolved in a mixture of 60% toluene and 40% amyl acetate to give a solution of 10% solids:

|  | Parts by weight |
|---|---|
| Pale crepe rubber | 9 |
| Pyroxylin (51 seconds) | 10 |
| Paraffin (M. P. 60–62° C.) | 40 |
| De-waxed gum dammar | 41 |

The process of coating, drying and humidifying is the same as set forth in Example A1.

The coatings are glass-clear.

*Example C2.*—The following ingredients in approximately the proportions set forth are dissolved in a mixture of 60% toluene and 40% amyl acetate to give a solids concentration of approximately 10%:

|  | Parts by weight |
|---|---|
| Pale crepe rubber | 9 |
| Pyroxylin (51 seconds) | 30 |
| Paraffin (M. P. 60–62° C.) | 11 |
| Gum mastic | 50 |

The process of coating, drying and humidifying is the same as in Example A1.

The coatings are clear.

Examples of rubber-pyroxylin-wax-resin-plasticizer

*Example D1.*—The following ingredients in the proportions set forth are dissolved in a mixture of 60% toluene and 40% amyl acetate to give a solution containing 10% solids:

|  | Parts by weight |
|---|---|
| Pale crepe rubber | 4 |
| Pyroxylin (51 seconds) | 27 |
| Paraffin (M. P. 60–62° C.) | 4.5 |
| De-waxed gum dammar | 50.5 |
| Tricresyl phosphate | 14 |

The coating, drying and humidifying are as set forth under Example A1.

The coatings are glass-clear.

*Example D2.*—Substitute "palm wax" for "paraffin" in Example D1.

*Example D3.*—Substitute "candelilla wax" for "paraffin" in Example D1.

*Example D4.*—Substitute ½ of the paraffin content in Example D1 with I. G. wax E (an ester of montanic acid).

*Example D5.*—Substitute "hydrogenated ester gum" for "de-waxed gum dammar" in Example D1.

*Example D6.*—Substitute "gum mastic" for "de-waxed gum dammar" in Example D1.

*Example D7.*—Substitute "hydrogenated rubber" for "pale crepe rubber" in Example D1.

*Example D8.*—Substitute "balata" for "pale crepe rubber" in Example D1.

The method of coating regenerated cellulose, drying and humidifying is the same as in Example A1.

The coating may be very slightly hazy without seriously impairing the transparency. The coated sheet may be brightened by polishing.

*Example D9.*—Substitute "pyroxylin (15 seconds)" for "pyroxylin (51 seconds)" in Example D1.

*Example D10.*—Substitute "low nitrogen nitrocellulose (11.9% nitrogen)" for "pyroxylin (51 seconds)" in Example D1.

*Example D11.*—The following ingredients are dissolved in a sufficient quantity of toluene to give approximately 10% solution of the solids:

| | Parts by weight |
|---|---|
| Pale crepe rubber | 6.5 |
| Benzene-soluble ethyl cellulose | 65 |
| Paraffin (M. P. 60–62° C.) | 8.5 |
| De-waxed gum dammar | 20 |

The coating, drying and humidifying are the same as in Example A1.

The coatings are clear.

*Example D12.*—Add 10 parts by weight of tricresyl phosphate to the solids mixture of Example D11.

*Examples illustrating the use of a blending agent*

*Example E1.*—The following ingredients in approximately the proportions set forth are dissolved in a mixture of 60% toluene and 40% amyl acetate to give approximately a 10% solution:

| | Parts by weight |
|---|---|
| Pale crepe rubber | 5.4 |
| Pyroxylin (51 seconds) | 43 |
| Paraffin (M. P. 60–62° C.) | 6.6 |
| Hydrogenated castor oil | 23 |
| Tricresyl phosphate | 23 |

The coating, drying and humidifying are the same as in Example A1.

The coating may be slightly hazy or possess a surface wax blush which may be removed, if desired, by polishing, buffing, etc.

*Example E2.*—The following ingredients in approximately the proportions set forth are dissolved in a sufficient quantity of a mixture containing 60% toluene and 40% amyl acetate to give a solution containing approximately 10% solids:

| | Parts by weight |
|---|---|
| Pale crepe rubber | 4 |
| Pyroxylin (51 seconds) | 27 |
| Vaseline | 5 |
| Paraffin (M. P. 60–62° C.) | 1 |
| Hydrogenated ester gum | 50 |
| Tricresyl phosphate | 13 |

The method of coating, drying and humidifying is the same as in Example A1.

The coatings are glass-clear in transparency.

Since it is obvious that various changes and modifications may be made in the above description without departing from the nature and spirit thereof, this invention is not restricted thereto except as set forth in the appended claims.

We claim:

1. An article of manufacture suitable for use as a wrapping tissue comprising a substantially transparent and non-fibrous base sheet formed of a material of the class which consists of cellulosic and albuminous substances coated on both sides thereof with a composition comprising a wax, a cellulose derivative and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 of an inch, said article being moistureproof, transparent and flexible.

2. An article of manufacture suitable for use as a wrapping tissue comprising a substantially transparent and non-fibrous base sheet formed of a material of the class which consists of cellulosic and albuminous substances coated on both sides thereof with a composition comprising a wax, a cellulose derivative, a blending agent and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 of an inch, said article being moistureproof, transparent and flexible.

3. An article of manufacture suitable for use as a wrapping tissue comprising a substantially transparent and non-fibrous base sheet formed of a material of the class which consists of cellulosic and albuminous substances coated on both sides thereof with a composition comprising a wax, a cellulose derivative, a plasticizer and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 of an inch, said article being moistureproof transparent and flexible.

4. An article of manufacture suitable for use as a wrapping tissue comprising a substantially transparent and non-fibrous base sheet formed of a material of the class which consists of cellulosic and albuminous substances coated on both sides thereof with a composition comprising a wax, a cellulose derivative, a blending agent, a plasticizer and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 of an inch, said article being moistureproof, transparent and flexible.

5. An article of manufacture suitable for use as a wrapping tissue comprising a substantially transparent and non-fibrous base sheet formed of a material of the class which consists of cellulosic and albuminous substances coated on both sides thereof with a composition comprising a wax, a cellulose derivative, a resin and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 of an inch, said article being moistureproof, transparent and flexible.

6. An article of manufacture suitable for use as a wrapping tissue comprising regenerated cellulose coated on both sides thereof with a composition comprising a wax, a cellulose derivative and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 of an inch, said article being moistureproof, transparent and flexible.

7. An article of manufacture suitable for use as a wrapping tissue comprising glassine paper coated on both sides thereof with a composition comprising a wax, a cellulose derivative and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 on an inch, said article being moistureproof, transparent and flexible.

8. An article of manufacture suitable for use as a wrapping tissue comprising a cellulose derivative sheet, produced by casting an aqueous cellulose derivative composition in film form, coated on both sides thereof with a composition comprising a wax, a cellulose derivative and a substance selected from the class which consists of pale crepe rubber, balata, gutta percha, caoutchouc, hydrogenated rubber, chlorinated rubber and "Plioform", the thickness of the coatings and the proportions of the ingredients thereof being such as to produce a transparent, moistureproof and flexible coating, the total thickness of the coatings on both sides being from 0.00001 to 0.00015 of an inch, said article being moistureproof, transparent and flexible.

9. An article of manufacture suitable for use as a wrapping tissue comprising a base sheet or film of transparent regenerated cellulose having a transparent, moistureproof and flexible coating on each side thereof, the total thickness of the coatings on both sides being from 0.00001 to 0.00015 of an inch, each of said coatings being formed of a composition which consists essentially of:

| | Parts by weight |
|---|---|
| Pale crepe rubber | 4 |
| Pyroxylin (51 seconds) | 27 |
| Paraffin (M. P. 60–62°C.) | 4.5 |
| De-waxed gum dammar | 50.5 |
| Tricresyl phosphate | 14 |

10. An article of manufacture suitable for use as a wrapping tissue comprising a base sheet or film of transparent regenerated cellulose having a transparent, moistureproof and flexible coating on each side thereof, the total thickness of the coatings on both sides being from 0.00001 to 0.00015 of an inch, each of said coatings being formed of a composition which consists essentially of:

| | Parts by weight |
|---|---|
| Pale crepe rubber | 6.5 |
| Benzene-soluble ethyl cellulose | 65.0 |
| Paraffin (M. P. 60–62° C.) | 8.5 |
| De-waxed gum dammar | 20.0 |

11. An article of manufacture suitable for use as a wrapping tissue comprising a base sheet or film of transparent regenerated cellulose having a transparent, moistureproof and flexible coating on each side thereof, the total thickness of the coatings on both sides being from 0.00001 to 0.00015 of an inch, each of said coatings being formed of a composition which consists essentially of:

| | Parts by weight |
|---|---|
| Pale crepe rubber | 7 |
| Pyroxylin (51 seconds) | 10 |
| Paraffin (M. P. 60–62° C.) | 83 |

WILLIAM HALE CHARCH.
ALBERT HERSHBERGER.